Jan. 11, 1966   D. S. ANTRIM   3,228,652
VALVE HAVING DOWNSTREAM FLUID PRESSURE SEAL
Filed Feb. 9, 1962
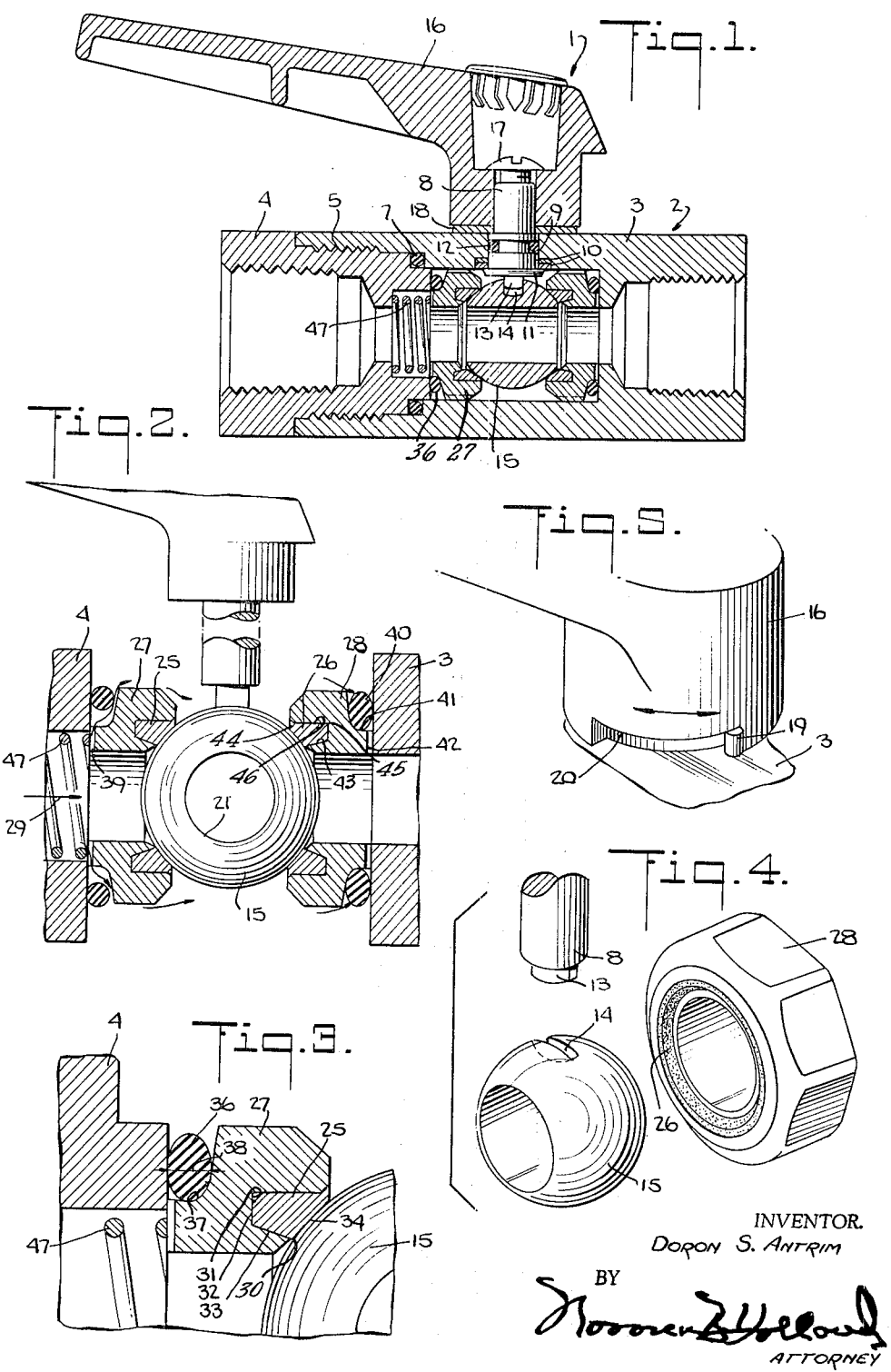
INVENTOR.
Doron S. Antrim
BY
ATTORNEY 3,228,652
VALVE HAVING DOWNSTREAM FLUID PRESSURE SEAL
Doron S. Antrim, Waldwick, N.J., assignor to Hoke Incorporated, Cresskill, N.J., a corporation of New York
Filed Feb. 9, 1962, Ser. No. 172,174
4 Claims. (Cl. 251—175)

The present invention relates to an improved ball valve and more particularly to a ball valve combining reduced handle torque with improved sealing at both high and low temperatures and pressures.

Ball valves are very useful in certain fluid control systems as they characteristically have a low pressure drop and tight shutoff with quick acting 90 degree valve handle rotation. This permits ball valves to provide effective control of high capacity fluid systems. Present ball valves, however, have not been suitable for use at high temperatures and pressures since high handle torques are required where suitable valve seats are used to provide tight sealing. Plastic materials are now available for valve seats which give good seals and which also permit extremely low handle turning torque. Teflon, for example, is one such material. Previous attempts, however, to use Teflon and other low torque materials in ball valve seats for high pressures and high temperature applications have not been successful due to the tendency of these materials to flow under such operating conditions. The valve of this invention has a novel valve seat structure which permits the use of valve seats such as Teflon and which eliminates valve failure due to the destruction of the valve seat under high pressure and temperature.

Accordingly, an object of the present invention is to provide an improved ball valve;

Another object of the present invention is to provide an improved ball valve having low handle torque and a tight shutoff seal for both high and low pressures and temperatures;

Another object of the present invention is to provide a ball valve with an improved valve seat.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a vertical sectional view of a preferred embodiment of the valve according to the invention;

FIG. 2 is an enlarged fragmentary sectional view showing the details of the valve seats;

FIG. 3 is an enlarged fragmentary detailed view of the valve seat and the check valve;

FIG. 4 is an exploded perspective of the valve stem, ball and seat; and

FIG. 5 is a perspective view of the valve handle showing the rotation limiting stop.

As illustrated in FIG. 1, the valve 1 comprises a body 2 having a main section 3 and an end section 4. These body sections are fastened together by threads 5 and an elastomer O-ring 7 is provided to seal the joint between the main section 3 and the end section 4. The valve stem 8 is inserted in an aperture 9 in the main section 3. The stem 8 is mounted in this position by being inserted through the aperture 9 from the inside of the center section 3. A pair of washers 10 made of a suitable bearing material such as Teflon are held in place on the stem 8 by flange 11 to hold the stem 8 in the center section 3 and to act as a torque reducing bearing for the stem 8. The O-ring 12 is mounted in a suitable channel in stem 8 to provide a fluid seal for the stem 8. A tongue 13 on the end of the stem 8 engages a complementary slot 14 in the ball 15. The valve handle 16 is removably attached to the stem 8 by the screw 17. A nylon washer 18 is fitted between the handle 16 and the center section 3 of the valve to further reduce friction during handle rotation. As illustrated in FIG. 5, a stop 19 is fitted in the valve center section 3 so that it engages the slot 20 in the valve handle 16 to limit handle movement to the correct 90 degree rotation.

The preferred embodiment of the valve seat is illustrated in detail in FIGS. 2 and 3. As seen in FIG. 2, the sealing is done by a pair of sealing rings 25 and 26 mounted on opposite sides of the ball 15 in annular retainers 27 and 28 respectively. I have found that improved sealing is obtained where the sealing is performed on the downstream side of the ball 15, i.e. where the sealing is at the sealing ring 26 when the fluid flow through the valve 1 is in the direction of the arrow 29 (FIG. 2). The reason for this will now be explained with particular reference to FIG. 3 which shows the upstream sealing ring 25 as mounted in the retainer 27. When the valve 1 is in the closed position as illustrated in FIG. 3, and if the sealing occurs between the ring 25 and the ball 15, the seal will be made at 30 on the surface of the ball 15 and at about the position 31 between the sealing ring 25 and retainer 27. This sealing results in a high pressure differential across the sealing ring 25 since high pressure fluid will enter behind the sealing ring 25 on the ring surfaces 32 and 33 while the surface 34 of the ring 25 is subjected to the lower downstream pressure. This results in a force behind the sealing ring 25 tending to force it out of the retainer 27. This force acts to cause a portion of the ring 25 to shear off when the ball 15 is moved to its open position and the flow hole 21 of the ball moves across that portion of the sealing ring 25 leaving it unsupported by the ball 15.

This tendency of the sealing ring 25 to be torn by the fluid pressure is eliminated in the valve 1 by the provision of the elastomer check valve 35. This check valve comprises an O-ring 36 mounted in the slot 37 formed between the rear surface of the retainer 27 and the valve end portion 4. The elastic O-ring 36 encircles the retainer 27 in slot 37 as illustrated in FIG. 1. The width of the slot 37 at the arrow 38 is less than the cross sectional diameter of the O-ring 36 at this position so that the O-ring 36 is squeezed by the opposite side walls of the slot 37. In addition, the slot 37 has an increasing width toward its open side to permit the check valve operation which will now be described with particular reference to FIG. 2.

With the valve 1 closed as illustrated in FIG. 2, the fluid pressure will build up on the upstream side of the ball 15. The pressure will act on the O-ring 36 as fluid passes through the radial channels 39 provided at the rear edge of the retainer 27. This fluid under pressure will cause the O-ring 36 to expand outwardly so that it rises in the slot 37 and moves towards the wider portions of the slot 37. This movement into the wider portions of the slot 37 reduces the squeezing of the O-ring 36 so that it no longer provides a seal and fluid passes by the ring 36 and the ball 15 into the area of the downstream retainer 28. The O-ring 40 on the downstream retainer 28 is identical to the above described O-ring 36 and is mounted in a similar slot 41. The O-ring 40 is forced inwardly by the high pressure fluid so that it is forced against the bottom of the slot 41 and acts as a seal to prevent fluid flow through channel 42 or otherwise to the downstream end of the valve 1. The high fluid pressure now applied against a major portion of the surface of the ball 15 tends to cause the ball 15 to force the ring 26 more tightly into its mounting slot 43 thus overcoming any tendency for sealing ring 26 to be blown out or torn as the valve is opened. The ring 26 also seals on ball 15 at 44 and in slot 43 at 45 so that only the upper surface 46 of the ring 26 is subjected to high pressure. This radially inwardly directed force has little or no tendency to blow the ring 26 out of its mounting slot 43. The symmetrical form of the valve provides this protective action no matter which end of the valve is connected to the high pressure side of the line.

The preferred embodiment of the check valves described above using O-rings 36 and 40 provides a particularly simple and effective check valve action. Other forms of check valve may be used such as, for example, a check valve in which the O-ring is replaced by a ring having a generally square cross section with a V-shaped channel on the outer rim. Such a ring when mounted in the slots in place of the O-rings will also provide a check valve effect as it will permit fluid under pressure to expand the ring radially outwardly on the upstream side for leakage outwardly while a seal is provided at the downstream side by fluid pressure acting inwardly on the V-shaped channel in the outer surface of the ring.

The preferred form of the mounting slots for the sealing rings 25 and 26 further minimizes the tendency of the sealing rings to be torn out of their mounting slots when subjected to high pressure. Teflon, for example, which is an excellent sealing ring material has a tendency to cold flow under pressure. Thus, where there is any opening or void, fluid pressure tends to cause the Teflon to flow into such an opening or void. The preferred embodiment of the mounting for rings 25 and 26 encloses the ring on all sides with the exception the small openings between the adjacent surfaces of the retainers 27 and 28 and the ball 15. These small openings limit the cold flow of the Teflon as they take advantage of the novel characteristic of Teflon whereby extremely thin layers can support high pressure loads without deforming even though thicker layers of Teflon will cold flow under pressure. Thus, any initial cold flow of the relatively thick Teflon rings 25 and 26 outwardly of the mounting grooves at these points results in the formation of a thin pressure resistant film. This film resists further deformation due to the above described property of thin layers of Teflon.

A coil spring 47 is mounted in the valve body end portion 4 in position to urge the retainer 27 toward ball 15 so that the sealing ring 25 is held tightly against the surface of the ball 15. Spring 47 improves the valve operation for low pressures after the valve has been used in high pressure systems. The use of the valve at extremely high pressures has been found to reduce the valve's sealing ability for subsequent use at low pressures. The spring 47 overcomes this by acting to force sealing ring 25 in retainer 27 against ball 15 and also ball 15 against the sealing ring 26 in retainer 28.

It will be seen that an improved ball valve is provided with a valve seat capable of providing tight sealing at high temperatures and pressures while at the same time requiring only minimum torque forces for valve handle operation. This novel ball valve seat structure permits the use of plastics which have desirable low torque properties for easy stem rotation while overcoming the related tendency of such materials to shear or otherwise deform when subjected to high pressures or temperatures. The improved ball valve structure provides these improved results with a relatively simple structure which permits its incorporation in a compact and rugged valve useful in a wide range of valve sizes and for valves which may be used over wide range of pressures and temperatures including high pressures and temperatures.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A ball valve comprising the combination of a valve body having a cavity connecting spaced ports, a rotatable ball in said cavity with a fluid passage therethrough to control fluid flow between said spaced ports, spaced sealing rings on opposite sides of said ball adapted to form a seal at opposite ends of the passage on the ball surface, a second fluid passage including said cavity connecting said spaced ports, and a check valve at each end of said second passage permitting fluid flow into the second passage from the ports and preventing fluid flow in the opposite direction comprising a flared portion in said second passage, and a resilient member seated therein having a width greater than the narrower width of said portion and less than the broader width of said portion whereby fluid passing from the narrow to the broad portions moves said resilient member away from the passage wall.

2. The valve as claimed in claim 1 in which said flared portion has an annular shape with the flare being outwardly toward its outer diameter, and said resilient member comprises an O-ring.

3. In a fluid control valve the combination of a valve body having a cavity connecting spaced ports, a pair of spaced annular coaxial retaining members in said cavity having first fluid passages therethrough, a rotatable member having a fluid port therethrough intermediate said retaining members, a sealing ring mounted in each retaining member encircling each of said first passages and engaging the surface of said rotatable member, a second fluid passage including said cavity positioned outwardly of the rings and said rotatable member and interconnecting the spaced ports, said second fluid passage including an annular groove at each end having an outwardly flaring cross section, and a resilient O-ring seated in the grooves having an inner diameter generally equal to the inner diameter of the groove and a cross sectional diameter greater than the narrower width of said flared groove.

4. In a ball valve the combination of a valve body having a cavity connecting spaced ports, a pair of spaced coaxial retaining members in said cavity having first fluid passages therethrough, a ball intermediate said members having a fluid port therethrough, a sealing ring mounted in each retaining member encircling each of said first passages and for engaging the surface of said ball at the opposite ends of said port, a second fluid passage including said cavity connecting the spaced ports, said second fluid passages including annular grooves intermediate said retaining members and said body, said grooves having a radially outwardly flaring cross section, and a resilient O-ring seated in each groove having an inner diameter generally equal to the inner diameter of the groove and a cross sectional diameter greater than the narrower width of said flared groove.

References Cited by the Examiner

UNITED STATES PATENTS

| | | | |
|---|---|---|---|
| Re. 24,102 | 12/1955 | Ohls | 251—172 |
| 2,606,740 | 8/1952 | Allen | 251—314 X |
| 2,614,793 | 10/1952 | Storm. | |
| 2,810,542 | 10/1957 | Bryant | 252—172 |
| 2,829,796 | 4/1958 | Dieny. | |
| 2,868,498 | 1/1959 | Kaiser | 251—315 X |
| 2,916,254 | 12/1959 | Wendell | 251—172 |
| 2,930,575 | 3/1960 | Britton | 251—315 X |
| 2,930,576 | 3/1960 | Sanctuary | 251—315 X |
| 2,950,897 | 8/1960 | Bryant | 251—172 |
| 2,963,263 | 12/1960 | Sanctuary | 251—315 X |
| 3,042,431 | 7/1962 | Kryzer. | |
| 3,047,265 | 7/1962 | Kaiser | 251—172 |
| 3,122,352 | 2/1964 | Anderson | 251—174 X |

ISADOR WEIL, *Primary Examiner.*